(12) United States Patent
Lau

(10) Patent No.: US 7,598,303 B2
(45) Date of Patent: Oct. 6, 2009

(54) PROCESS FOR MAKING AN AQUEOUS DISPERSION

(75) Inventor: Willie Lau, Lower Gwynedd, PA (US)

(73) Assignee: Rohm and Haas Company, Philadelphia, PA (US)

( * ) Notice: Subject to any disclaimer, the term of this patent is extended or adjusted under 35 U.S.C. 154(b) by 544 days.

(21) Appl. No.: 11/338,369

(22) Filed: Jan. 24, 2006

(65) Prior Publication Data

US 2006/0183839 A1    Aug. 17, 2006

Related U.S. Application Data

(60) Provisional application No. 60/653,783, filed on Feb. 17, 2005.

(51) Int. Cl.
*A61K 8/73* (2006.01)
(52) U.S. Cl. .............. 524/27; 524/367; 524/457; 524/458; 524/460; 524/556; 524/801; 524/832; 524/853; 525/329.5; 525/329.7; 525/330.3; 525/333.3; 526/201
(58) Field of Classification Search .............. 524/556
See application file for complete search history.

(56) References Cited

U.S. PATENT DOCUMENTS

| | | | |
|---|---|---|---|
| 4,134,872 A | 1/1979 | Lee | |
| 4,325,856 A | 4/1982 | Ishikawa et al. | |
| 4,477,622 A * | 10/1984 | Sanderson et al. | .......... 524/522 |
| 4,478,974 A | 10/1984 | Lee et al. | |
| 5,236,991 A | 8/1993 | Makati et al. | |
| 5,521,266 A | 5/1996 | Lau | |
| 6,191,244 B1 | 2/2001 | Lau et al. | |
| 6,262,149 B1 | 7/2001 | Clark et al. | |
| 6,624,223 B1 | 9/2003 | Thames et al. | |
| 2001/0034400 A1 | 10/2001 | Mestach | |
| 2002/0055587 A1 | 5/2002 | Lau et al. | |
| 2002/0064652 A1 | 5/2002 | Lau et al. | |
| 2002/0128367 A1 | 9/2002 | Daisey et al. | |
| 2002/0161098 A1 * | 10/2002 | Lau et al. | ..................... 524/460 |
| 2005/0014883 A1 | 1/2005 | Blankenship et al. | |

FOREIGN PATENT DOCUMENTS

| WO | WO 97/09354 | 3/1997 |
|---|---|---|
| WO | WO 2004/078807 A | 9/2004 |

* cited by examiner

*Primary Examiner*—Marc S Zimmer
*Assistant Examiner*—Nicole M Buie
(74) *Attorney, Agent, or Firm*—Thomas S. Deibert

(57) ABSTRACT

A process for making an aqueous dispersion is provided. More specifically, a process for making an aqueous dispersion having at least two polymeric components is provided.

9 Claims, No Drawings

PROCESS FOR MAKING AN AQUEOUS DISPERSION

This application claims the benefit of U.S. Provisional Application No. 60/653,783, filed on Feb. 17, 2005.

The present invention relates to a process for making an aqueous dispersion, more specifically, aqueous dispersions having at least two polymeric components.

Aqueous dispersions of polymers, which are referred to in the art as latexes, are generally known to be useful as components of, for example, adhesive formulations, binder formulations and coating formulations. It is often desirable to include a component, typically a low molecular weight polymeric material, into such formulations to modify one or more properties thereof, for example, Tg, miscibility, adhesion, tack, coalescence, tensile strength, tensile elongation, modulus and polymer flow. It is often difficult, however, to evenly disperse such low molecular weight polymeric materials into the latex. Moreover, given the difficulty of evenly dispersing such low molecular weight polymeric materials into a latex, it is often necessary to incorporate an excess of the low molecular weight polymeric material to impart the desired property to the latex.

One approach for providing a latex containing a low molecular weight component as a tackifier in an adhesive formulation is disclosed by Makati, et al., in U.S. Pat. No. 5,236,991. Makati, et al. disclose a method for producing an in situ tackified structured latex prepared by emulsion polymerization having at least two polymeric phases, a first polymeric phase (adhesive phase) comprising a polymer having a Tg of from about −70° C. to about −5° C., and a second polymeric phase (tackifier phase) comprising a polymer that is compatible with the first polymeric phase having a number average molecular weight less than 5,000 and a Tg from about −15° C. to about +50° C. said first polymeric phase comprising from about 95 percent to 50 percent of the latex and the second polymeric phase comprising from about 5 percent to 50 percent of the latex, such percentages being measured on a dry weight basis.

Notwithstanding, alternative processes for preparing latex formulations that overcome the historic difficulties of evenly dispersing therein a low molecular weight polymeric component are still need.

In one aspect of the present invention, there is provided a process for forming an aqueous dispersion having at least two polymeric components, comprising:
(i) forming at least one high molecular weight polymeric component; and,
(ii) forming at least one low molecular weight polymeric component according to formula I:

$$A\text{-}B \qquad (I)$$

wherein A is derived from a chain transfer component that exhibits low water solubility and B is a polymer chain and wherein the low molecular weight polymeric component is formed in the presence of a macromolecular organic compound having a hydrophobic cavity.

In another aspect of the present invention, there is provided a process for forming an aqueous dispersion having at least two polymeric components, comprising:
(i) polymerizing at least one first monomer to form a high molecular weight polymeric component; and,
(ii) adding, to the product of (i),
 (a) at least one second monomer;
 (b) at least one macromolecular organic compound having a hydrophobic cavity; and,
 (c) at least one chain transfer component that exhibits low water solubility;
wherein (a), (b) and (c) interact to form a low molecular weight polymeric component according to formula I:

$$A\text{-}B \qquad (I)$$

wherein A is derived from the at least one chain transfer component that exhibits low water solubility and wherein B is a polymer chain; and,
wherein the at least one first monomer and the at least one second monomer may be the same or different.

In another aspect of the present invention, there is provided a process for forming an aqueous dispersion having at least two polymeric components, comprising:
(i) combining
 (a) at least one first monomer;
 (b) at least one macromolecular organic compound having a hydrophobic cavity; and,
 (c) at least one chain transfer component that exhibits low water solubility;
wherein (a), (b) and (c) interact to form a low molecular weight polymeric component according to formula I:

$$A\text{-}B \qquad (I);$$

wherein A is derived from the at least one chain transfer component that exhibits low water solubility and wherein B is a polymer chain;
(ii) adding at least one second monomer to the product of (i); and
(iii) polymerizing the at least one second monomer to form a high molecular weight polymeric component;

wherein the at least one first monomer and the at least one second monomer may be the same or different.

All ranges defined herein are inclusive and combinable.

The term "water soluble" used herein and in the appended claims refers to materials that are completely soluble in water.

The term "having low water solubility" used herein and in the appended claims refers to materials that exhibit a water solubility at 25 to 50° C. of no greater than 150 millimoles/liter.

The term "having very low water solubility" used herein and in the appended claims refers to materials that exhibit a water solubility at 25 to 50° C. of no greater than 50 millimoles/liter.

The term "having extremely low water solubility" used herein and in the appended claims refers to materials that exhibit a water solubility at 25 to 50° C. of no greater than 0.1 millimoles/liter.

The term "having high water solubility" used herein and in the appended claims refers to materials that exhibit a water solubility at 25 to 50° C. of greater than 200 millimoles/liter.

The term "(meth)acrylate" used herein and in the appended claims encompasses both methacrylate and acrylate.

The term "(meth)acrylic" used herein and in the appended claims encompasses both methacrylic and acrylic.

The term "(meth)acrylamide" used herein and in the appended claims encompasses both methacrylamide and acrylamide.

The term "aqueous system" used herein and in the appended claims refers to a polymer formed and supplied in water as the continuous phase wherein no organic solvent or high level of surfactant is required to form the polymer or to store and supply the polymer.

In some embodiments, the low molecular weight component is formed within the high molecular weight component. For example, the aqueous dispersion may exhibit a core/shell morphology with the low molecular weight component as the core material. Alternatively, the low molecular weight component may be encapsulated by the high molecular weight component.

In some embodiments, the chain transfer agent may be selected from mercaptans, polymercaptans, thioesters, halogenated compounds and combinations thereof.

In some embodiments, the chain transfer component may be selected from substituted ($C_{16}$ to $C_{24}$) alkylmercaptans, unsubstituted ($C_{16}$ to $C_{24}$) alkylmercaptans, functionalized ($C_{16}$ to $C_{24}$) alkylmercaptans, substituted phenyl mercaptans, unsubstituted phenyl mercaptans, functionalized phenyl mercaptans, substituted ($C_{14}$ to $C_{24}$) alkylmercaptopropionates, unsubstituted ($C_{14}$ to $C_{24}$) alkylmercaptopropionates, functionalized ($C_{14}$ to $C_{24}$) alkylmercaptopropionates and combinations thereof.

In some embodiments, the chain transfer component may be n-dodecyl mercaptan.

In some embodiments, 0.5 to 20 mol % (based on moles of monomer) of the at least one chain transfer component may be added to form the low molecular weight polymeric component; alternatively 1 to 10 mol % (based on moles of monomer) of the at least one chain transfer component may be added to form the low molecular weight polymeric component; alternatively 1 to 5 mol % (based on moles of monomer) of the at least one chain transfer component may be added to form the low molecular weight polymeric component; alternatively less than 5 mol % (based on moles of monomer) of the at least one chain transfer component may be added to form the low molecular weight polymeric component; alternatively less than 4 wt % (based on moles of monomer) of the at least one chain transfer component may be added to form the low molecular weight polymeric component.

In some embodiments, the chain transfer component may exhibit a low water solubility, alternatively the chain transfer component may exhibit an extremely low water solubility, alternatively the chain transfer component may exhibit a water solubility at 25 to 50° C. of less than 0.01 millimoles/liter, alternatively the chain transfer component may exhibit a water solubility at 25 to 50° C. of less than 0.002 millimoles/liter, alternatively the chain transfer component may exhibit a water solubility at 25 to 50° C. of less than 0.0001 millimoles/liter.

In some embodiments, the high molecular weight polymeric component and the low molecular weight polymeric component may exhibit different Tg's. In some embodiments, this difference in the Tg exhibited by the high molecular weight polymeric component and the Tg exhibited by the low molecular weight polymeric component when commingled in the aqueous dispersion may be less than the difference in the Tg exhibited by those polymeric components separately. The reduction in the difference in the Tg's may be expressed as a percentage reduction according to the following equation:

$$\frac{100 * [TgHMWc - TgLMWc]}{[TgHMWi - TgLMWi]}$$

wherein TgHMWc is the Tg exhibited by the high molecular weight polymeric component when it is commingled with the low molecular weight polymeric component in the aqueous dispersion, TgLMWc is the Tg exhibited by the low molecular weight polymeric component when it is commingled with the high molecular weight polymeric component in the aqueous dispersion, TgHMWi is the Tg exhibited by the high molecular weight polymeric component in the absence of the low molecular weight polymeric component, TgLMWi is the Tg exhibited by the low molecular weight polymeric component in the absence of the high molecular weight polymeric component. In some embodiments, the percentage reduction in the difference in the Tg's is at least 25%, alternatively at least 50%, alternatively at least 70%, alternatively at least 80%, alternatively at least 90%, alternatively at least 95%.

In some embodiments, the high molecular weight component and the low molecular weight component may exhibit a single Tg when commingled in the aqueous dispersion.

Macromolecular organic compounds having a hydrophobic cavity suitable for use with the present invention include, for example, cyclodextrin, cyclodextrin derivatives, cyclic oligosaccharides having a hydrophobic cavity, calyxarenes, cavitands and combinations thereof.

In some embodiments, the marcomolecular organic compound having a hydrophobic cavity may be selected from α-cyclodextrin, β-cyclodextrin, γ-cyclodextrin and combinations thereof.

In some embodiments, the macromolecular organic compound having a hydrophobic cavity may be selected from methyl derivatives of α-cyclodextrin, methyl derivatives of β-cyclodextrin, methyl derivatives of γ-cyclodextrin, triacetyl hydroxypropyl derivatives of α-cyclodextrin, triacetyl hydroxypropyl derivatives of β-cyclodextrin, triacetyl hydroxypropyl derivatives of γ-cyclodextrin, hydroxyethyl derivatives of α-cyclodextrin, hydroxyethyl derivatives of β-cyclodextrin, hydroxyethyl derivatives of γ-cyclodextrin and combinations thereof.

In some embodiments, the macromolecular organic compound having a hydrophobic cavity may be selected from cycloinulohexose, cycloinuloheptose, cycloinuloctose and combinations thereof.

In some embodiments, the macromolecular organic compound having a hydrophobic cavity is methyl-β-cyclodextrin.

In some embodiments, the high molecular weight polymeric component is monomer derived.

In some embodiments, the polymer chain B of the low molecular weight polymeric component is monomer derived.

Monomers suitable for use with the present invention include, for example, α,β-ethylenically unsaturated monomers (e.g., primary alkenes); styrene; alkylsubstituted styrene; α-methyl styrene; vinyltoluene; vinyl esters of $C_4$-$C_{30}$ carboxylic acids (e.g., vinyl 2-ethylhexanoate, vinyl neodecanoate); vinyl chloride; vinylidene chloride; N-alkyl substituted (meth)acrylamide (e.g., octyl acrylamide and maleic acid amide); vinyl alkyl ethers with $C_3$-$C_{30}$ alkyl groups; aryl ethers with $C_3$-$C_{30}$ alkyl groups (e.g., stearyl vinyl ether); $C_1$-$C_{30}$ alkyl esters of (meth)acrylic acid (e.g., methyl methacrylate, ethyl(meth)acrylate, butyl(meth)acrylate, 2-ethylhexyl(meth)acrylate, benzyl(meth)acrylate, lauryl(meth) acrylate, oleyl(meth)acrylate, palmityl(meth)acrylate, stearyl(meth)acrylate); unsaturated vinyl esters of (meth) acrylic acid; multifunctional monomers (e.g., pentaerythritol triacrylate); monomers derived from cholesterol; ethylene; vinyl acetate; surfactant monomers (e.g., $C_{18}H_{27}$-(ethylene oxide)$_{20}$ methacrylate and $C_{12}H_{25}$-(ethylene oxide)$_{23}$ methacrylate); α,β-monoethylenically unsaturated monomers containing acid-functionality (e.g., acrylic acid and methacrylic acid, acryloxypropionic acid, (meth)acryloxypropionic acid, itaconic acid, maleic acid or anhydride, fumaric acid, crotonic acid, monoalkyl maleates, monoalkyl fumarates, monoalkyl itaconates); acid substituted (meth)acrylates; sulfoethyl methacrylate; acid substituted (meth)acrylamides (e.g., 2-acrylamido-2-methylpropylsulfonic acid); basic substituted (meth)acrylates (e.g., dimethylaminoethyl methacrylate, tertiary-butylaminoethyl methacrylate); basic substituted (meth)acrylamides (e.g., dimethylaminopropyl methacrylamide); acrylonitrile; (meth)acrylamide; substituted (meth)acrylamide (e.g., diacetone acrylamide); (meth)acrolein; and methyl acrylate.

In some embodiments, the high molecular weight polymeric component may be derived from one or more monomers selected from lauryl acrylate (LA); lauryl methacrylate (LMA); butyl acrylate (BA); ethyl acrylate (EA); 2-ethylhexyl acrylate (2EHA); methyl methacrylate (MMA); methacrylic acid (MAA); acrylic acid (AA); acrylamide (AM; vinyl acetate (VA); $C_{18}H_{27}$-(ethylene oxide)$_{20}$ methacrylate; $C_{12}H_{25}$-(ethylene oxide)$_{23}$ methacrylate); hydroxyethyl acrylate (HEA); hydroxyethyl methacrylate (HEMA) and n-vinyl pyrrolidone (NVP).

In some embodiments, the polymer chain B of the low molecular weight polymeric component may be derived from one or more monomers selected from lauryl acrylate (LA); lauryl methacrylate (LMA); butyl acrylate (BA); ethyl acrylate (EA); 2-ethylhexyl acrylate (2EHA); methyl methacrylate (MMA); methacrylic acid (MAA); acrylic acid (AA); acrylamide (AM; vinyl acetate (VA); $C_{18}H_{27}$-(ethylene oxide)$_{20}$ methacrylate; $C_{12}H_{25}$-(ethylene oxide)$_{23}$ methacrylate); hydroxyethyl acrylate (HEA); hydroxyethyl methacrylate (HEMA) and n-vinyl pyrrolidone (NVP).

In some embodiments, the high molecular weight polymeric component may exhibit a number average molecular weight of at least 50,000; alternatively of at least 100,000.

In some embodiments, the low molecular weight polymeric component may exhibit a number average molecular weight of no more than 10,000; alternatively of less than 6,000; alternatively of less than 3,000; alternatively in the range of 1,000 to 4,000.

In some embodiments, the polymer chain B may exhibit a degree of polymerization of no more than 100, alternatively less than 60, alternatively less than 40.

In some embodiments, the molar ratio of the macromolecular organic compound having a hydrophobic cavity to the chain transfer component is from 5:1 to 1:5,000; alternatively 1:1 to 1:5,000; alternatively 1:1 to 1:1,000; alternatively 1:2 to 1:1,000; alternatively 1:1 to 1:500.

In some embodiments, the polymeric components of the present invention may be prepared using conventional free radical aqueous solution or emulsion polymerization techniques well known in the art. The polymerizations may be carried out as batch, semicontinuous or continuous reactions. The polymerization may be carried out as part of a sequential polymerization.

In some embodiments, free radical initiators may be used to prepare the polymeric components of the present invention. Free radical initiators suitable for use with the present invention include, for example, hydrogen peroxide, tert-butyl hydroperoxide, sodium persulfate, potassium persulfate, lithium persulfate and ammonium persulfate.

In some embodiments, reducing agents may be used in the preparation of the polymeric components of the present invention. Reducing agents suitable for use with the present invention include, for example, bisulfite (e.g., alkali metal metabisulfite, hydrosulfite and hyposulfite), sodium formaldehyde sulfoxylate and reducing sugars (e.g., ascorbic acid).

In some embodiments, a reducing agent may be used in combination with an initiator to form a redox system. For example, 0.01 wt % to 2 wt % (based on the weight of monomer) of an initiator may be used in combination with 0.01 wt % to 2 wt % of a reducing agent to form a redox system.

In some embodiments, transition metal catalysts, such as iron salts, may be used in the preparation of the polymeric components of the present invention.

In some embodiments, polymerization temperatures used in the preparation of the polymeric components of the present invention may be in the range of (i) 10° C. to 120° C. for an aqueous emulsion polymerization or a solution polymerization; (ii) 60 C. to 90° C. for a persulfate system; or (iii) 20° C. to 70° C. for a redox system.

In some embodiments involving emulsion polymers, emulsifiers or dispersing agents may be employed for preparing the monomer emulsions or polymer emulsions. Such emulsifiers or dispersing agents may be anionic, cationic or nonionic. In some embodiments, mixtures of emulsifiers and dispersing agents may be used.

Suitable nonionic emulsifiers may include, for example, ethoxylated octylphenols, ethoxylated nonylphenols, ethoxylated fatty alcohols and combinations thereof.

Suitable anionic emulsifiers may include, for example, sodium lauryl sulfate, sodium dodecylbenzene sulfonate, sulfated derivatives of nonylphenols, ethoxylated derivatives of nonylphenols, octylphenols, fatty alcohols, esterified sulfosuccinates and combinations thereof.

Suitable cationic emulsifiers may include, for example, lauryl pyridinium chlorides, cetyldimethyl amine acetate, $C_8$-$C_{18}$ alkyldimethylbenzeylammonium chlorides and combinations thereof.

In some embodiments, the amount of emulsifier used may be from 0.1 wt % to 10 wt % (based on the total monomer).

In some embodiments, aqueous dispersions prepared by the methods of the present invention may efficaciously be used in, for example, adhesive formulations, architectural coatings, traffic paints, industrial coatings, floor polishes, automotive coatings, coatings for plastics, inkjet inks, leather coatings, leather treatments, wood finishes and cementitious coatings.

In some embodiments, aqueous dispersions prepared by the methods of the present invention may efficaciously be incorporated into architectural coating formulations. It has been surprisingly found that the incorporation of such aqueous dispersions into architectural coating compositions can reduce the quantity of conventional coalescents needed to facilitate ambient film formation, while not adversely affecting dry film properties, such as, durability, mechanical strength, block resistance and dirt pick up resistance.

EXAMPLES

Some embodiments of the present invention will now be described in detail in the following examples.

The following examples were performed using a 4 neck 5,000 mL round bottom flask as the reaction vessel. The subject flask was fitted with a water-cooled reflux condenser with a nitrogen purge gas outlet, a thermocouple attached to an $I^2R$ Tow TC Adapter Model TCA/1 temperature controller, a glass stirrer equipped with a paddle, controlled by a Fisher Maxima™ digital stir motor and a monomer and initiator feed line controlled by a QG-50 FMI pump fitted with ¼ inch tubing. The contents of the reaction vessel were heated using a heating mantle connected to either a 120V Variac Type 3PN1010 model from Staco Energy Products or Type 3PN16C model from Superior Electric Company. All of the reactants used were weighed using a Metler PC 8000 balance.

Example 1

Including Methyl-β-Cyclodextrin

Deionized water (400 g), sodium carbonate (5 g) and an anionic surfactant (18.8 g) were added to the reaction vessel at room temperature. The contents of the reaction vessel were then heated to 85° C. with stirring under a nitrogen purge. An ammonium persulfate solution (5 g in 25 g of deionized water) was then added to the reaction vessel with continued stirring. Two minutes after the ammonium persulfate addition, a latex polymer seed composition (137.6 g) was added to the reaction vessel with continued stirring over a period of 5 minutes. Two monomer emulsions 1 and 2 (ME1 & ME2, respectively) were prepared in a separate container in accordance with Table 1.

TABLE 1

| ME# | $H_2O$ | Surf. | BA | MMA | MAA | ODM |
|---|---|---|---|---|---|---|
| 1 | 312.5 g | 7.1 g | 375 g | 367 g | 7.5 g | 0 g |
| 2 | 312.5 g | 7.1 g | 375 g | 367 g | 7.5 g | 125 g |

Subsequent to the latex polymer seed composition charged, the ME1 was added to the reaction vessel over a period of 60 minutes with continued stirring while maintaining a reaction temperature of 83° C. to 85° C. An ammonium persulfate initiator solution (1 g in 100 g of deionized water) was co-fed with the ME1 addition to the reaction vessel. At the end of the ME1 feed, Methyl-β-cyclodextrin (30 g of a 50.8% solution) was added to the reaction vessel. The ME2 was then added to the reaction vessel over a period of 60 minutes with continued stirring while maintaining a reaction temperature of 83° C. to 85° C. Another ammonium persulfate initiator solution (1 g of ammonium persulfate in 100 g of deionized water) was added with the ME2 addition to the reaction vessel. After the ME2 addition, the contents of the reaction vessel were chased with a redox initiator and neutralized.

Example 2

No Methyl-β-Cyclodextrin

Example 1 was repeated, except that the methyl-β-cyclodextrin additions were omitted.

Example 3

Product Characterization

The two products of Example 1 and Example 2 were characterized to determine wt % solids, particle size and molecular weight (bimodal distribution for the product of both Examples). The weight percent solids was determined using conventional gravimetric analysis techniques. The particle size analysis was performed using a Matec CHDF 2000 particle size analyzer. The molecular weights were determined by SEC using a polystyrene standard from Polymer Laboratories (PS-1) having a peak average molecular weight ranging from 580 to 7,500,000. Mark-Houwink constants were applied for the conversion. The results of these analyses are presented in Table 2.

TABLE 2

| Product | % solids | Particle Size (in nm) | Molecular wt. | | pH |
|---|---|---|---|---|---|
| Ex. 1 | 51.7 | 151 | 3,174 | 226,853 | 8.5 |
| Ex. 2 | 52.0 | 167 | 857 | 81,525 | 8.3 |

As noted in Table 2, the SEC results showed a different distribution for the product of Example 1 compared to that of Example 2. The SEC measurement of the product of Example 2 showed no detectable level for a lower molecular weight polymeric component. A peak was detected at below 1,000, however, that peak is consistent with unreacted octyldecylmercaptan.

I claim:

1. A process for forming an aqueous dispersion having at least two polymeric components, comprising:
   (i) forming at least one high molecular weight polymeric component; and,
   (ii) forming at least one low molecular weight polymeric component according to formula I:

A-B    (I)

wherein A is derived from a chain transfer component that exhibits a water solubility at 25 to 50° C. of no greater than 150 millimoles/liter and B is a polymer chain; wherein the low molecular weight polymeric component is formed in the presence of a macromolecular organic compound having a hydrophobic cavity selected from cyclodextrin, cyclodextrin derivatives, cyclic oligosaccharides having a hydrophobic cavity, calyxarenes, cavitands and combinations thereof; wherein the low molecular weight component is formed within the high molecular weight polymeric component; wherein the low molecular weight polymeric component exhibits a number average molecular weight of no more than 10,000 and the high molecular weight polymeric component exhibits a number average molecular weight of at least 50,000.

2. The process of claim 1, whereas the chain transfer component is selected from the groups consisting of mercaptans, polymercaptans, thioesters and halogenated compounds and combinations thereof.

3. The process of claim 1, wherein the chain transfer component is selected from the groups consisting of chain transfer agents exhibits a water solubility at 25 to 50° C. of no greater than 0.1 millimoles/liter.

4. The process of claim 1, wherein the chain transfer component is n-dodecyl mercaptan.

5. The process of claim 1, wherein the chain transfer component is selected from substituted, unsubstituted and functionalized ($C_{16}$ to $C_{24}$) alkylmercaptans; substituted, unsubstituted and functionalized phenyl mercaptans; and, substituted, unsubstituted and functionalized ($C_{14}$ to $C_{24}$) alkylmercaptopropionates.

6. The process of claim 1, wherein the polymer chain B exhibits a degree of polymerization of no more than 100.

7. The process of claim 1, wherein the difference in the Tg of the high molecular weight polymeric component and the Tg of the low molecular weight polymeric component is narrower than for the Tg's exhibited by the polymeric components separately.

8. A process for forming an aqueous dispersion having at least two polymeric components, comprising:
   (i) polymerizing at least one first monomer to form a high molecular weight polymeric component; and, (ii) adding, to the product of (i),
  (a) at least one second monomer;
  (b) at least one macromolecular organic compound having a hydrophobic cavity selected from cyclodextrin, cyclodextrin derivatives, cyclic oligosaccharides having a hydrophobic cavity, calyxarenes, cavitands and combinations thereof; and,
  (c) at least one chain transfer component that exhibits low water solubility;
wherein (a), (b) and (c) interact to form a low molecular weight polymeric component according to formula I:

A-B            (I);

wherein A is derived from the at least one chain transfer component that exhibits a water solubility at 25 to 50° C. of no greater than 150 millimoles/liter and wherein B is a polymer chain; and, wherein the at least one first monomer and the at least one second monomer may be the same or different; wherein the low molecular weight component is formed within the high molecular weight polymeric component; wherein the low molecular weight polymeric component exhibits a number average molecular weight of no more than 10,000 and the high molecular weight polymeric component exhibits a number average molecular weight of at least 50,000.

9. A process for forming an aqueous dispersion having at least two polymeric components, comprising:
(i) combining
  (a) at least one first monomer;
  (b) at least one macromolecular organic compound having a hydrophobic cavity selected from cyclodextrin, cyclodextrin derivatives, cyclic oligosaccharides having a hydrophobic cavity, calyxarenes, cavitands and combinations thereof; and,
  (c) at least one chain transfer component that exhibits low water solubility;
wherein (a), (b) and (c) interact to form a low molecular weight polymeric component according to formula I:

A-B            (I);

wherein A is derived from the at least one chain transfer component that exhibits a water solubility at 25 to 50° C. of no greater than 150 millimoles/liter and wherein B is a polymer chain;
(ii) adding at least one second monomer to the product of (i); and
(iii) polymerizing the at least one second monomer to form a high molecular weight polymeric component;
wherein the at least one first monomer and the at least one second monomer may be the same or different; wherein the low molecular weight component is formed within the high molecular weight polymeric component; wherein the low molecular weight polymeric component exhibits a number average molecular weight of no more than 10,000 and the high molecular weight polymeric component exhibits a number average molecular weight of at least 50,000.

* * * * *

UNITED STATES PATENT AND TRADEMARK OFFICE
CERTIFICATE OF CORRECTION

PATENT NO. : 7,598,303 B2  Page 1 of 1
APPLICATION NO. : 11/338369
DATED : October 6, 2009
INVENTOR(S) : Willie Lau It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Twenty-eighth Day of September, 2010

David J. Kappos
*Director of the United States Patent and Trademark Office*